June 15, 1926.                    1,588,610
W. H. PONSONBY
ELECTROMAGNETIC BRAKE VALVE
Filed May 7, 1924

WITNESSES:
R. J. Butler.
H. C. Lowe.

INVENTOR
William H. Ponsonby.
BY
Wesley J. Carr
ATTORNEY

Patented June 15, 1926.

1,588,610

UNITED STATES PATENT OFFICE.

WILLIAM H. PONSONBY, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTROMAGNETIC BRAKE VALVE.

Application filed May 7, 1924. Serial No. 711,522.

My invention relates to electropneumatic brake valve devices and it has particular relation to magnetic valve devices employed to govern the operation of the air-brakes of railroad locomotives and cars.

One object of my invention is to provide a single unit for electropneumatically governing the emergency air-line or emergency pipe of the airbrake apparatus of a train.

Another object of my invention is to provide an electropneumatically operated brake valve device which shall be simple and economical in construction and positive and reliable in operation.

Still another object of my invention is to provide an electrically operated brake valve device which may be remotely controlled by the operator of the train.

A further object of my invention is to provide an electrically operated brake valve device provided with a time-element device for preventing the setting of the brakes of a train when the train is passing over an insulated cross-over or other portion of insulated track.

Heretofore, it has been necessary to use more than one piece of apparatus for governing the emergency pipe of the air-brake system of a train.

Briefly speaking, my invention comprises providing an electrically governed device having a movable valve member for governing the flow of air through the emergency pipe of the air-brake system of a train, the operation of this valve member being controlled pneumatically by means of another valve member that is governed electrically by a controller, which is usually situated in the front of a train.

My invention further comprises providing a time-element device for governing the speed at which the valve member controlling the emergency pipe line opens.

Figure 1:
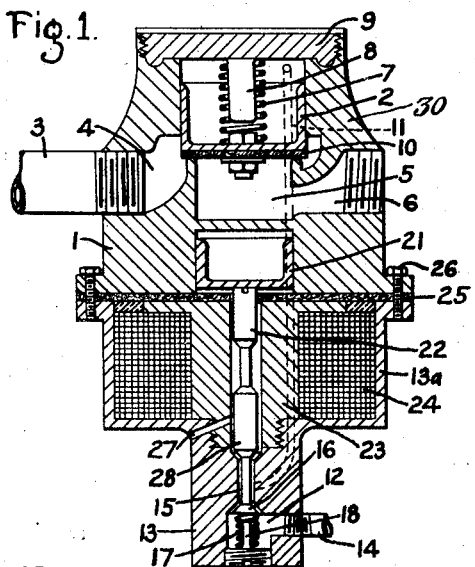
Figure 2:
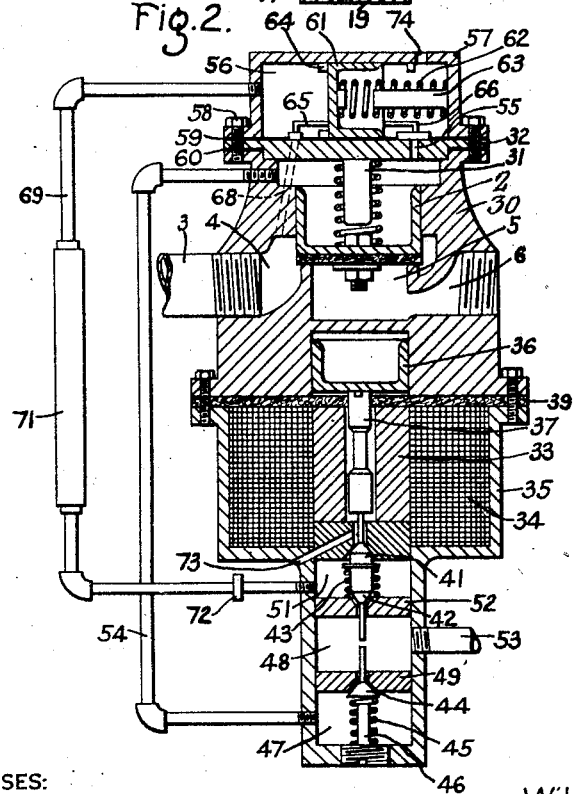

For a better understanding of my invention, reference may be made to the accompanying drawing:

Figure 1 of which is a view, partly in section and partly in side elevation, of an electro-pneumatically operated brake-valve device, constructed in accordance with my invention; and Fig. 2 is a view, partly in side elevation and partly in section, of a modified form of electropneumatic brake-valve device constructed in accordance with my invention and provided with means for governing the speed at which the valve device operates.

Referring particularly to Fig. 1 of the drawing, an electro-magnetic brake-valve device comprises a hollow stationary member 1, a cup-shaped valve member 2, which is slidably mounted therein and which governs the flow of air or other fluid from an emergency pipe 3 through an inlet port 4, a chamber or cavity 5 and an outlet port 6 to the atmosphere. The valve member 2 divides the cavity 5 into an upper and a lower section, and is biased to its closed or lower position by means of a resilient member or spring 7, which is mounted upon a stud 8 of a threaded cap 9. The valve member 2 is equipped with a piston ring 10 made of leather or some other suitable material.

A pipe 11 pneumatically connects the upper section of cavity or chamber 5 to a cavity or chamber 12 which is located within the cylindrically shaped bottom member 13. The chamber 12 is, in turn, connected pneumatically to a suitable source of fluid supply by means of a supply pipe 14.

An opening or air-duct 15 which extends upwardly from the chamber 12, is normally closed by a valve member 16, which is maintained in its closed position by means of an upwardly-acting resilient member or spring 17. The resilient member or spring 17 is mounted upon a stud 18 for making the chamber 12 air-tight. A threaded cap or plug 19 is provided.

The valve member 16 is mechanically connected to a cup-shaped armature member 21 by means of a valve stem 22. The operation of the armature member 21 is governed by a stationary iron core member 23 which is detachably mounted within a cylindrical member of casing 13a, which may be integral with the bottom member 13. The iron core member 23 is surrounded by a coil or solenoid 24.

The hollow stationary member 1 and the cylindrically shaped member 13a of the electromagnetic valve device are separated by an insulating member 25, these three parts being mechanically connected together by means of a plurality of bolts 26.

The opening or air-duct 15 is directly connected to an exhaust or outlet port 27. A second valve member 28, which is securely mounted on the valve stem 22, governs the emission of air or other fluid from the cavity 12 through the outlet port 27 to the atmosphere. It will be noted that the pipe 11 communicates with the duct 15 between the valve members 16 and 28.

The operation of the valve device is effected by energizing the coil 24, thereby causing a downward movement of the armature 21. The downward movement of the armature 21 actuates the valve member 16 to its open position and the valve member 28 to its closed position.

Upon the opening of the valve 16, fluid from a suitable source of supply not illustrated passes through the pipe 14, chamber 12, airduct 15 and pipe 11, into the upper portion of the chamber 5, thereby applying pneumatic pressure to the valve member 2. Such pressure upon the valve member 2, assisted by the pressure of the resilient member 7, actuates the valve member 2 from its open to its closed position.

When the valve member 2 occupies its closed position, the flow of fluid from the emergency pipe 3 to the inlet port 4 is shut off, thereby effecting the release of the air brakes (not illustrated), in a well-known manner.

When it is desired to set the brakes, the coil 24 is deenergized by the operation of a controller not illustrated, thereby releasing the armature 21, which is actuated to its upper position by means of the resilient member 17. The valve member 16 is thus actuated to its closed position, while the valve member 28 is actuated to its open position, by spring 17. When the valve member 16 occupies its closed position, the fluid pressure is shut off from the air-duct 15, and the fluid pressure upon the valve member 2 is removed by the escape of the fluid from the chamber 5 through pipe 11, duct 15 and outlet port 27 to the atmosphere.

When the downward pressure on the piston 2 is diminished, the fluid pressure from the emergency pipe 3 is sufficient to force the piston 2 upwardly and the fluid escapes or bleeds through the chamber 5 and the outlet port 6, to effect a setting of the brakes, in accordance with a familiar practice.

Normally the fluid pressure from the emergency pipe acting upon the piston 2 is of relatively small value, not being sufficient to force the piston 2 to its open position when the piston is actuated to its closed position by the combined force of the resilient member 7 and the pressure of the fluid that is applied through the pipe 11.

However, when the fluid pressure is relieved from the upper side of the valve member 2, the fluid pressure through the inlet port 3 is sufficient to start the valve member 2 upwardly, and the effective pressure area is rapidly increased as the valve member 2 rises.

Referring to Fig. 2 of the drawing, an electromagnetic brake-valve device, comprises a hollow stationary member 30 and a cup-shaped valve member 2 slidably mounted therein.

The electromagnetic brake-valve device is also provided with emergency pipe 3, inlet port 4, cavity or chamber 5 and outlet or exhaust port 6, which are similar to those illustrated in Fig. 1 of the drawing. The valve member 2 is biased to its lower or closed position by a resilient member 7 which is mounted upon a stud 31 constituting a part of a cap member 32. The valve member 2 divides the cavity 5 into an upper and a lower part, as in Fig. 1.

A stationary iron core member 33 is located below member 30 and is enclosed by a solenoid 34, which is mounted in a cylindrically shaped member or casing 35. A cup-shaped armature 36 is mechanically connected to a valve stem 37 and is adapted to be actuated within the hollow stationary member 30, when the solenoid 34 is energized. The solenoid 34, iron core member 33 and cylindrically shaped casing 35 are electrically insulated from the hollow stationary member 30 by means of a ring 39 of insulating material. A plurality of bolts 26 are employed to secure the hollow stationary member 30 to the cylindrically shaped member 35.

A normally closed valve member 41 and a normally open valve member 42 are securely mounted to the valve stem 37, these valve members being located below the core member 33. A resilient member or spring 43 is employed for maintaining the valve member 41 in its closed position and valve member 42 in its open position.

A valve member 44 is located near the bottom of the device and is normally maintained in its closed position by means of a resilient member or spring 45, which is mounted on a stud 46. A bottom chamber 47 is separated from a chamber 48 by means of an apertured horizontal metallic wall 49. A chamber 51 is located above the chamber 48 and is separated therefrom by means of an apertured metallic wall 52.

A source of fluid supply (not illustrated)

is connected by pipe 53 to chamber 48. A pipe 54 pneumatically connects chamber 47 with the upper portion of chamber 5, which is provided with a port 55 that opens into a chamber 56.

The chamber 56 is formed by a hollow member 57 being mounted upon the cap member 32 by means of a plurality of bolts 58. The chamber 56 is provided with a cup-shaped piston 61. Leather rings 59 and 60 are positioned against the threaded cap 32 to render the chambers 5 and 56 airtight.

The piston 61 is slidably mounted in the chamber 56 and is biased to its illustrated closed position by means of a resilient member or coil spring 62, which is mounted upon a stud 63, that constitutes a part of or is secured to one end wall of the hollow member 57. A plurality of stop members 64 are provided for limiting the travel of the piston 61. A plurality of slide-valve members 65 and 66 are mechanically connected to the piston 61. The valve member 66 is adapted to normally close the port 55. The valve member 65 is adapted to normally close an air duct 68 extending from the inlet port 4 to the cavity 56.

A pipe line 69 pneumatically connects chamber 51 with chamber 56. A reservoir or relatively large pipe 71 is connected in the pipe line 69 for the purpose of providing a time-element means for retarding and regulating the operation of the piston 61, as hereinafter more fully set forth.

An adjustable valve member or restricting device 72 of any well-known design for regulating the flow of fluid through the pipe line 69 is also provided. A port 73 is provided for exhausting air or other fluid from the cavity 51, when the valve 42 occupies its lower position.

The operation of the electro-pneumatic brake device is effected by energizing the solenoid 34. Upon the energization of the solenoid 34, the armature 36 is actuated to its lower position, thereby actuating the valve members 41 and 44 to their open positions and the valve member 42 to its closed position. The air pressure or other fluid pressure normally present in the cavity 56 by reason of its communication with the supply pipe 53 is expelled through the pipe line 69, reservoir 71, adjustable valve member 72, chamber 51 and port 73 to the atmosphere, by reason of the spring 62 forcing the piston 61 to its closed position. When the valve members 65 and 66 are actuated to their closed positions by the piston 61, air or other fluid under pressure is conveyed from the chamber 48, past the valve member 44, through the chamber 47, pipe line 54 and the upper portion of chamber 5 to the valve member 2.

The valve member 2 is thus actuated to its closed position by the fluid pressure thereon in conjunction with the pressure of the resilient member 7. When the valve member 2 is in its closed position, only a relatively small portion of the air or other fluid from the emergency pipe 3 acts upon the piston 2, which, consequently, remains in its closed position.

When it is desired to apply the brakes, the solenoid 34 is de-energized, thereby releasing the armature 36, and the resilient member 43 opens the valve member 42 and closes the valve member 41. The resilient member 45 actuates the valve 44 to its closed position.

Upon the opening of the valve member 42, fluid under pressure is applied from chamber 48 through chamber 51, adjustable restricting device 72, and reservoir 71 of the pipe line 69 into chamber 56. The fluid pressure in the chamber 56 is applied against the piston 61, thereby slowly actuating it to its "open" position.

Upon a relatively small movement of the piston 61, the valve member 65 is actuated to its open position, thereby opening the air-duct from the emergency pipe line 3 and port 4 to chamber 56. The pressure upon the piston 61 is thereby considerably increased and it is actuated rapidly to its open position.

The valve member 66 is then actuated to its open position, and the fluid pressure within the chamber 5 is lessened by escape through port 55 into a part of chamber 56 and thence, through port 74, into the atmosphere.

When the fluid pressure is exhausted from chamber 5, the pressure of the fluid in the emergency pipe line 3 and the port 4 upon the valve member 2 actuates the valve member to its open position. This upward movement is accelerated when the valve member 2 rises a short distance, as the effective pressure area on the valve member 2 is increased.

When the valve member 2 is in its upper position, the fluid from emergency pipe line 3 escapes through port 4, chamber 5 and port 6 into the outer atmosphere, thereby setting the brakes, as previously set forth.

The speed at which the electro-pneumatic valve device operates may be diminished by increasing the size of the reservoir 71 or by diminishing the size of the opening through the restricting device 72; and the converse holds true, as will be understood.

The purpose of this time-element feature of the electro-pneumatic brake-valve device is to prevent the setting of the air-brakes of a train upon the train's passage over an insulated track, joint, or the like.

While I have shown my invention in its preferred forms, it is apparent that minor modifications may be made in the arrangement of the parts of the apparatus without departing from the spirit of my invention.

I desire, therefore, to be limited only by the scope of the appended claims.

I claim as my invention:

1. In a pneumatic control device, in combination, a main valve disposed for reciprocatory movement to control an air line, means for applying fluid pressure to opposite sides of the valve, a resilient member tending to move the valve in one direction, an auxiliary valve for relieving the pressure on one side of the main valve and electro-pneumatic means for operating said auxiliary valve.

2. In a pneumatic control device, in combination, a valve disposed for reciprocatory movement to control an air line, means for applying fluid pressure to opposite sides of the valve, a resilient member tending to move the valve in one direction, an auxiliary valve for relieving the pressure on one side of the main valve and electro-pneumatic means for operating said auxiliary valve, said electro-pneumatic means being adapted to delay, for a predetermined time after the initiation of its operation, the actuation of said auxiliary valve.

3. In a pneumatic control device, in combination, a valve disposed for movement in different directions to control the flow of a fluid in a pipe line, means for applying pressure to opposite sides of the valve, means disposed for operation to release the fluid pressure applied to one side of the valve to permit movement of the valve in one direction, a resilient member cooperative to effect movement of the valve in another direction and electro-pneumatic means for operating said fluid-pressure-releasing means, said electro-pneumatic means being adapted to delay, for a predetermined time after the initiation of its operation, the actuation of said fluid-pressure-releasing means.

4. In a pneumatic valve device, the combination with a stationary member, of a valve member movably mounted therein and adapted to be actuated to a plurality of positions, resilient means for biasing said member towards one position, electrically governed means for actuating said valve member in the same direction, means for actuating said valve member to another position, and means for rendering said electrically governed means inoperative.

5. In a pneumatic valve device, the combination with a stationary member, of a valve member movably mounted therein and adapted to be actuated to a plurality of positions, means for applying fluid pressure for actuating said valve member in one direction, means for applying fluid pressure for actuating said valve member in another direction, and means for controlling the rate of change in said fluid pressure.

6. In a pneumatic valve device, the combination with a stationary member, of a valve member adapted to be actuated therein to a plurality of positions, means for applying fluid pressure to actuate said valve member to one position, electrically governed means for applying fluid pressure to actuate said valve member to a second position, and means for varying the rate of operation of said electrically governed means.

7. In a pneumatic valve device, the combination with a stationary member, of a valve member adapted to be actuated therein to a plurality of positions, means for applying fluid pressure to actuate said valve member to one position, electrically governed means for applying fluid pressure to actuate said valve member to a second position, and means comprising a reservoir for varying the rate of operation of said electrically governed means.

8. In a pneumatic valve device, the combination with a stationary member, of a valve member adapted to be actuated therein to a plurality of positions, means for applying fluid pressure to actuate said valve member to one position, electrically governed means for applying fluid pressure to actuate said valve member to a second position, and means comprising a variable restrictive device for varying the rate of operation of said electrically governed means.

9. In a pneumatic valve device, the combination with a stationary member, of a valve member adapted to be actuated therein to an open position and a closed position, means for applying fluid pressure to open said valve member, means for applying fluid pressure to close said valve member, and means for retarding the operation of said closing means.

10. In a pneumatic valve device, the combination with a stationary member, of a valve member adapted to be actuated therein to an open position and a closed position, means for applying fluid pressure to open said valve member, means for applying fluid pressure to close said valve member, and means comprising a reservoir for retarding the operation of said closing means.

11. In a pneumatic valve device, the combination with a stationary member, of a valve member adapted to be actuated therein to an open position and a closed position, means for applying fluid pressure to open said valve member, electrically governed means for applying fluid pressure to close said valve member, and means for retarding the operation of said closing means.

12. In a pneumatic valve device, the combination with a stationary member, of a valve member movably mounted therein, said valve member having a plurality of positions, means for applying pressure to actuate said valve member to its open position, means comprising an electrically operated valve member for applying pressure to said first valve member to actuate it to another position, and means comprising a plurality of valve members and a cylinder for varying the speed of operation of said first valve member.

13. In a pneumatic valve device, the combination with a hollow stationary member, of a valve member slidably mounted therein and having an open and a closed position, resilient means for positioning said valve member in its closed position, means for applying fluid pressure to open said valve member, electromagnetic means for applying fluid pressure upon said valve member to close said valve member, and adjustable pneumatic means governed by said electromagnetic means for varying the speed of operation of said valve member.

In testimony whereof, I have hereunto subscribed my name this 25th day of April, 1924.

WILLIAM H. PONSONBY.